United States Patent
Theocharous et al.

(10) Patent No.: US 12,047,273 B2
(45) Date of Patent: Jul. 23, 2024

(54) ACTIVE CONTROL SYSTEM FOR DATA STREAM ALLOCATION

(71) Applicant: ADOBE INC., San Jose, CA (US)

(72) Inventors: Georgios Theocharous, San Jose, CA (US); Kai Wang, Cambridge, MA (US); Zhao Song, Seattle, WA (US); Sridhar Mahadevan, San Jose, CA (US)

(73) Assignee: ADOBE INC., San Jose, CA (US)

(*) Notice: Subject to any disclaimer, the term of this patent is extended or adjusted under 35 U.S.C. 154(b) by 175 days.

(21) Appl. No.: 17/671,075

(22) Filed: Feb. 14, 2022

(65) Prior Publication Data

US 2023/0261966 A1  Aug. 17, 2023

(51) Int. Cl.
*H04L 45/02* (2022.01)
*H04L 41/147* (2022.01)

(52) U.S. Cl.
CPC ............ *H04L 45/08* (2013.01); *H04L 41/147* (2013.01)

(58) Field of Classification Search
CPC .............................. H04L 45/08; H04L 41/147
USPC ......................................................... 709/224
See application file for complete search history.

(56) References Cited

U.S. PATENT DOCUMENTS

| | | | |
|---|---|---|---|
| 10,908,940 B1* | 2/2021 | Farhan | H04L 41/0806 |
| 2009/0260016 A1* | 10/2009 | Ramakrishnan | G06F 9/5083 |
| | | | 718/105 |
| 2010/0106990 A1* | 4/2010 | Kalman | G06F 3/067 |
| | | | 713/340 |
| 2010/0274885 A1* | 10/2010 | Yoo | H04L 67/1008 |
| | | | 709/224 |
| 2013/0085791 A1* | 4/2013 | Flockhart | G06Q 10/06 |
| | | | 705/7.13 |
| 2018/0132174 A1* | 5/2018 | Strong | H04L 45/00 |
| 2020/0136975 A1* | 4/2020 | Arora | H04L 43/045 |

* cited by examiner

*Primary Examiner* — Suraj M Joshi
(74) *Attorney, Agent, or Firm* — Shook, Hardy & Bacon L.L.P.

(57) ABSTRACT

A control system facilitates active management of a streaming data system. Given historical data traffic for each data stream processed by a streaming data system, the control system uses a machine learning model to predict future data traffic for each data stream. The control system selects a matching between data streams and servers for a future time that minimizes a cost comprising a switching cost and a server imbalance cost based on the predicted data traffic for the future time. In some configurations, the matching is selected using a planning window comprising a number of future time steps dynamically selected based on uncertainty associated with the predicted data traffic. Given the selected matching, the control system may manage the streaming data system by causing data streams to be moved between servers based on the matching.

20 Claims, 6 Drawing Sheets

ACTIVE CONTROL SYSTEM FOR DATA STREAM ALLOCATION

BACKGROUND

Streaming data systems, such as the Apache Kafka system, are designed to handle the continuous flow of data traffic generated by a large number of different sources. Incoming data traffic to a streaming data system are organized into data streams (e.g., topics or topic partitions in the Apache Kafka system). Each data stream may be an ordered collection of data from an incoming stream of data traffic. A streaming data system maintains a discrete bipartite matching between different data streams and multiple servers to process incoming data traffic in real time. When data for a specific data stream is received, the data is routed to the server that is responsible for processing the data stream and gets stored in the server for later access. A streaming data system may also map a data stream to multiple servers to create replicas and achieve better robustness.

When the data traffic of different data streams is imbalanced, servers can experience imbalanced traffic load, which can become an issue if any of the servers is overloaded, resulting in a long latency in processing data. This problem is further complicated by the potential change of data traffic, where data traffic of different data streams can frequently change and cause imbalance issues.

SUMMARY

Embodiments of the present disclosure relate to, among other things, a control system that facilitates active management of streaming data systems. Given historical data traffic for each data stream processed by a streaming data system, a machine learning model of the control system predicts future data traffic for each data stream. Using the predicted data traffic, the control system selects a matching between data streams and servers for a future time that minimizes a total cost comprising a switching cost and a server imbalance cost based on the predicted data traffic for the future time. The server imbalance cost represents a cost associated with having servers with imbalanced traffic load, and the switching cost represents a cost to switch data streams between servers. In some configurations, a matching is selected using a planning window comprising a number of future time steps. The planning window may be dynamically determined by selecting a number of future time steps such that a total uncertainty associated with the predicted future data traffic within the planning window is less than a maximum switching cost. Given a selected matching, the control system may manage the streaming data system by causing data streams to be moved between servers at a future time based on the matching.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Server imbalance issues are an ongoing challenge for streaming data systems, such as the Apache Kafka system. Conventional approaches to address server imbalance include human effort to manually adjust the matching assignment between data streams and servers to try to maintain server balance. To automate the maintenance process, control systems have been introduced that automatically monitor and adjust the matching assignment. These control systems can accept various goals and constraints and adjust matching assignments to optimize the goals and satisfy the constraints.

Although adjusting the matching between data streams and servers can help alleviate the server imbalance issues, switching between different servers requires moving existing data streams stored in the previously assigned servers to the newly assigned servers to allow accessing the old data later. Data migration associated with switching data streams among servers, however, can consume a large amount of energy and impact server storage life.

Current data stream allocation approaches (including manual approaches and automated control systems) only passively control the allocation of data streams to servers. In particular, the current approaches reallocate data streams to servers based on the occurrence of an event (e.g., high data traffic on a server) in order to meet desired goals and constraints. As such, conventional approaches are reactive in that they wait until there is a server imbalance to reallocate data streams. This server imbalance can involve overloaded servers with increased data processing latency. Additionally, because conventional approaches react to events, the reallocations may not be appropriate for future data traffic. This can result in reallocating data streams too frequently, which can produce large energy costs and negatively impact server life.

Embodiments of the present disclosure address these shortcomings of conventional approaches to data stream allocation in streaming data systems by providing a control system that, among other things, actively manages the allocation of data streams to servers. The control system uses historical data traffic to generate predicted data traffic for each data stream for a streaming data system. The control system uses the predicted data traffic for the data streams to determine a future allocation of the data streams to servers. In accordance with some aspects, the control system selects a matching by solving an optimization problem that minimizes a total cost comprising a server imbalance cost and a switching cost determined using predicted data traffic at a future time step. The server imbalance cost represents a cost associated with having servers with imbalanced traffic load. The switching cost represents a cost to switch one or more data streams from one server to another server. Given a selected matching between data streams and servers at a future time step, the control system moves data stream(s) based on the matching at the future time step.

In some configurations, the control system dynamically selects a planning window for determining a matching. The planning window represents a number of time steps for determining a matching. The planning window is dynamically determined based on uncertainty associated with the predicted data traffic. For instance, the planning window may be determined by selecting a number of future time steps such that the total uncertainty within the planning window is less than a maximum switching cost. This recognizes that a larger planning window can involve high uncertainty that can result in an inaccurate matching; while a small planning window can result in reallocating data streams to servers too frequently.

The technology described herein provides advantages over conventional control systems and manual management of streaming data system. Instead of passively managing the allocation of data streams to servers as in conventional approaches, the control system described herein predicts future data traffic for data streams and actively reallocates data streams to servers based on the predicted data traffic. By determining reallocations based on predicted data traffic, the technology described herein can better balance the load across servers while also reducing the number of data stream migrations. As a result, servers are less likely to become overloaded and experience data processing latency. Additionally, reducing the number of migrations helps conserve energy and extend the storage life of servers.

Example System for Active Control of Streaming Data

Figure 1:
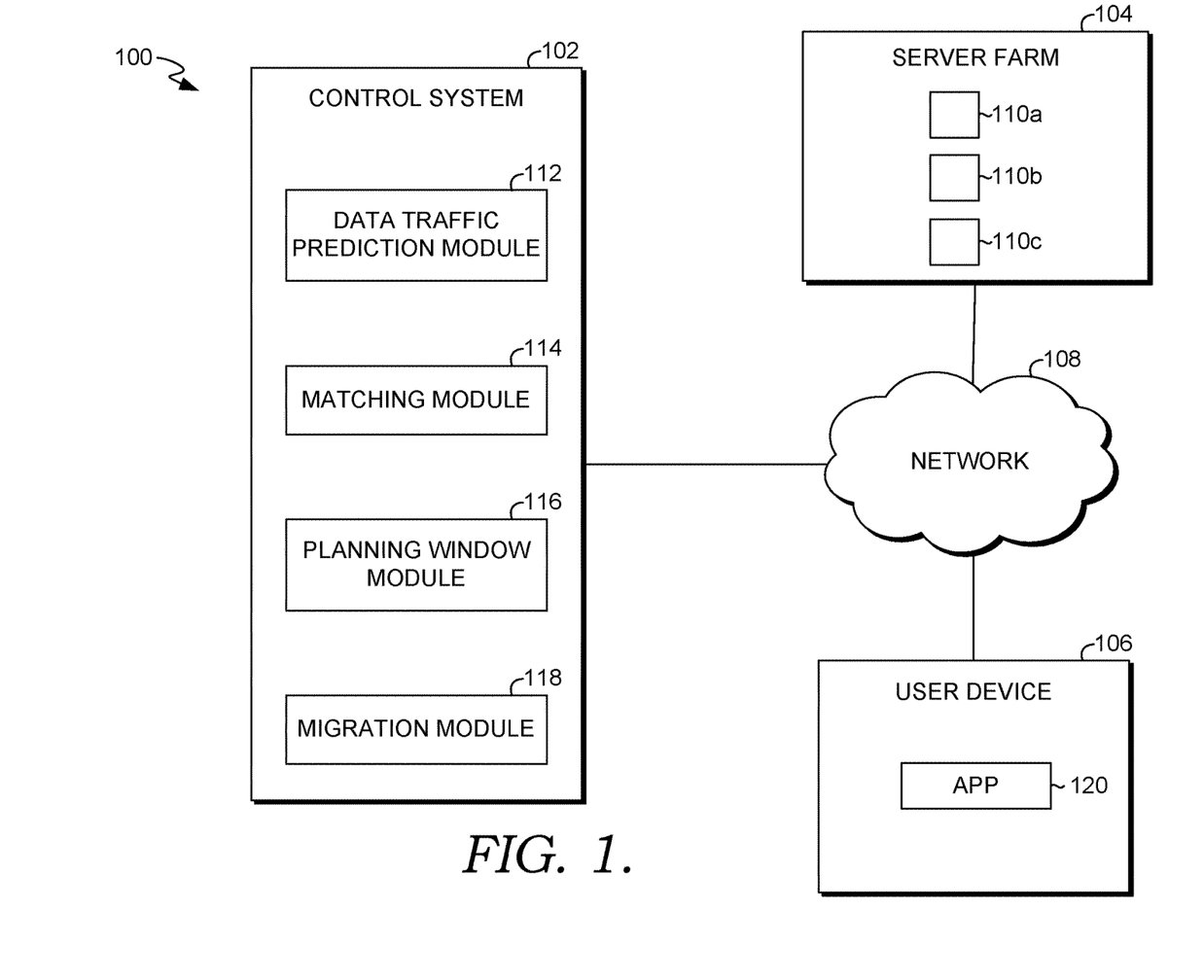
FIG. 1 is a block diagram illustrating an exemplary system in accordance with some implementations of the present disclosure.

With reference now to the drawings, FIG. 1 is a block diagram illustrating an exemplary system 100 for actively controlling allocations of data streams to servers in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a control system 102, server farm 104, and a user device 106. The server farm 104 may include any number of servers, such as servers 110*a*, 110*b*, and 110*c*. Each of the control system 102, servers in the server fame 104, and user device 106 shown in FIG. 1 can comprise one or more computer devices, such as the computing device 600 of FIG. 6, discussed below. As shown in FIG. 1, the control system 102, server farm 104, and user device 106 can communicate via a network 108, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present disclosure. Each may comprise a single device or multiple devices cooperating in a distributed environment. For instance, the control system 102 could be provided by multiple devices collectively providing the functionality of the control system 102 as described herein. Additionally, other components not shown may also be included within the network environment.

Figure 2:
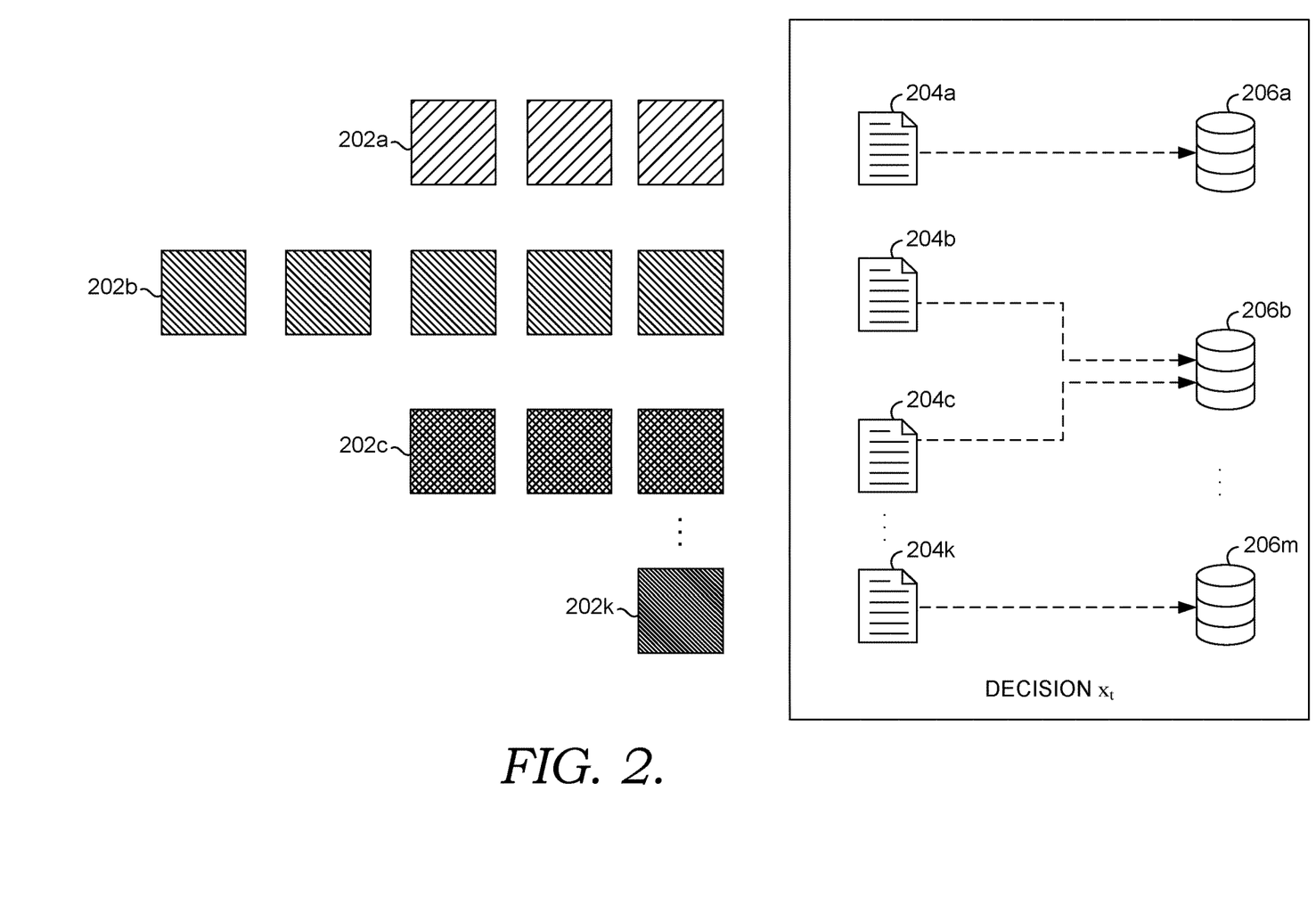
FIG. 2 is a diagram showing matching of data streams to servers in accordance with some implementations of the present disclosure.

At a high level, the control system 102 actively controls the allocation of data streams to servers in the server farm 104. Given predicted data traffic for each stream, the control system 102 selects a matching between data streams and servers in the server farm 104. For instance, by way of illustration with reference to FIG. 2, a streaming data system may ingest data traffic, including data traffic 202*a*, 202*b*, 202*c*, and 202*k*, for each of k data streams, including data stream 204*a*, 204*b*, 204*c*, and 204*k*, respectively. Additionally, the system may comprise m servers, including servers 206*a*, 206*b*, and 206*m*. At each time step t, the system maintains a bipartite matching $x_t$ between the k data streams and m servers so that the servers can process the data traffic in real time. Each of the data streams is matched to one of the servers. Given this system, $x_t \in X_t \subseteq \{0,1\}^{k \times m}$ with $x_{t,i,j}=1$ is used to denote that data stream i is assigned to server j at time t. For instance, in the example of FIG. 2, the matching $x_t$ at time step t assigns data stream 204*a* to server 206*a*, data streams 204*b* and 204*c* to server 206*b*, and data stream 204*k* to server 206*m*. While FIG. 2 provides an example, in which the number of data streams corresponds with the incoming data traffic, in some configurations, the data streams being matched to servers includes replicas. For instance, given a system that includes a replica for each original data stream and k incoming data traffic, the system may determine a matching for 2k data streams (i.e., each original data stream and its replica).

Returning to FIG. 1, the control system 102 includes a data traffic prediction module 112, a matching module 114, a planning window module 116, and a migration module 118. These components may be in addition to other components that provide further additional functions beyond the features described herein. The control system 102 can be implemented using one or more devices, one or more platforms with corresponding application programming interfaces, cloud infrastructure, and the like. While the control system 102 is shown separate from the user device 106 in the configuration of FIG. 1, it should be understood that in other configurations, some or all of the functions of the control system 102 can be provided on the user device 106.

The data traffic prediction module 112 of the control system 102 generates predicted data traffic for each data stream from a collection of data streams processed by the server farm 104. The data traffic prediction module 112 generates the predicted data traffic based on historical data traffic for each data stream. In some configurations, the data traffic prediction module 112 employs a machine learning model that, given the historical data traffic for each data stream, predicts future data traffic for each data stream. In some cases, the machine learning model may comprise a Gaussian regression model. For a given data stream, the machine learning model generates a predicted data traffic value for each of a number of future time steps. In some instances, the machine learning model can also provide an uncertainty value associated with the predicted data traffic for each data stream at each future time step. An uncertainty value represents a measure of uncertainty associated with the prediction used to generate a predicted data traffic value at a given future time step.

Given k data streams, the data traffic prediction module 112 may generate k time series, where each represents the trend of incoming traffic $\{\theta_{t,i}\}_{t \in [T]}$ of data stream i∈ [k]. For instance, each time series may be generated by a composition of sine waves, an autoregressive process, and a Gaussian process to model the seasonality, trend, and the random process. By way of example only and not limitation, the system may use sine waves with periods of 24 and 2 with amplitudes drawn from U[1, 2] and U[0.5, 1] to model the daily and hourly changes. An autoregressive process may be used that takes the weighted sum of 0.9 of the previous signal and a 0.1 of a white noise to generate the next signal. A rational quadratic kernel may be used as the Gaussian process kernel. At time step t, to predict the incoming traffic $\theta_s \in \Theta \subseteq \mathbb{R}^k$ for all s≥t, the historical data $\{\theta_{s'}\}_{s' < t}$ prior to time t is collected and a Gaussian process regression may be applied using the same rational quadratic kernel on the historical data to generate predictions $\{\theta_s^{(t)}\}_{s \geq t}$ of the future time steps. The standard deviation learned from Gaussian process regression may be used as the uncertainty $\{\epsilon_s^{(t)}\}_{s \geq t}$.

Figure 3A:
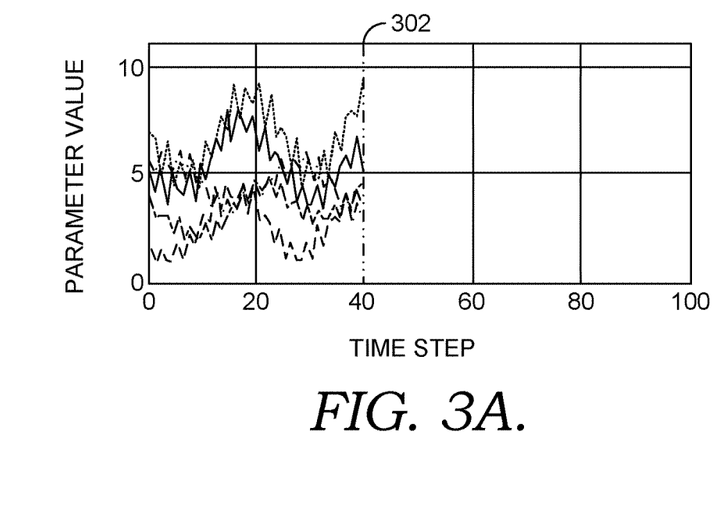
FIGS. 3A-3C are diagrams showing generation of predicted data traffic from historical data traffic for use in determining a matching between data streams and servers in accordance with some implementations of the present disclosure.
Figure 3B:
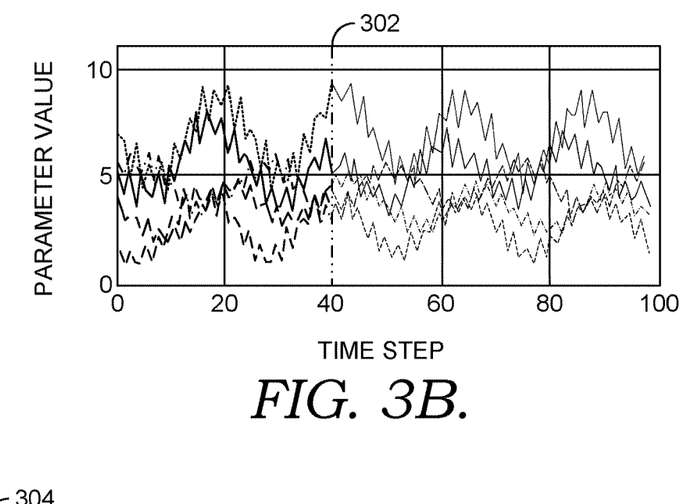

By way of example to illustrate, FIG. 3A shows a time series of historical data traffic parameter values prior to a current time t 302 for each of a number of data streams. The data traffic parameter values may comprise a data rate for each data stream at each time step. Given the historical data traffic parameter values for each data stream, data traffic parameter values for future time steps after time t 302 are predicted for each of the data streams, as shown in FIG. 3B. Although not shown in FIG. 3A, an uncertainty associated with each predicted data traffic parameter value may also be determined at each time step. The uncertainty at each time step for a data stream may represent a range of data traffic parameter values at the time step.

Figure 3C:
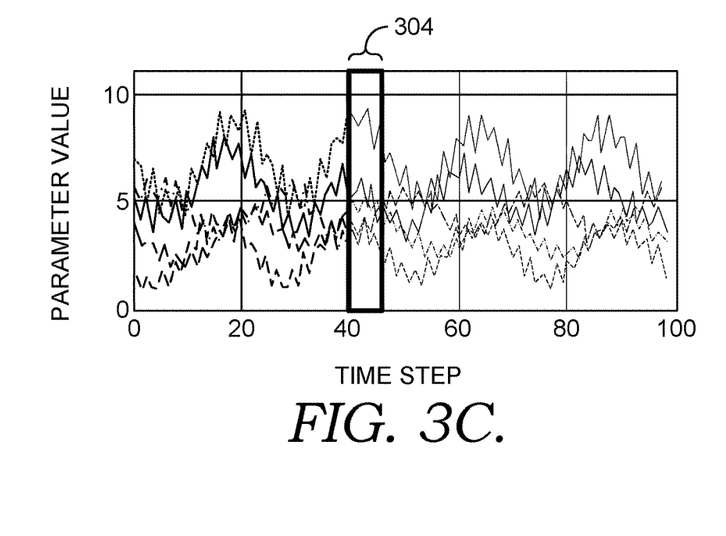

Returning again to FIG. 1, given the predicted data traffic generated for each data stream by the prediction module 112, the matching module 114 determines a matching between the data streams and servers in the server farm 104. In accordance with some configurations, the matching module 114 uses the predicted data traffic to select an optimal matching by solving an optimization problem that minimizes a total loss function comprising a server imbalance cost and a switching cost computed given the predicted data traffic. This may be done for a planning window that includes a number of future time steps. For instance, FIG. 3C illustrates a planning window 304 that comprises a number of future times steps. In some configurations, the planning window may be a fixed number of time steps. In other configurations, as will be discussed in further detail below, the planning window may be dynamic such that the number of time steps are selected.

Given the predicted data traffic for each data stream, an optimization problem is solved that minimizes a cost calculated using a cost function that includes a server imbalance cost $f(x_t, \theta_t)$ and a switching cost d(x,y):

$$\min_{x_t \in X} \sum_{t=1}^{S} f(x_t, \theta_t) + d(x_t, x_{t-1})$$

The server imbalance cost represents a cost associated with imbalanced load on the servers. Given predicted data traffic $\theta_t$ and a given matching $x_t$, $f(x_t, \theta_t) = \|x_t^T \theta_t\|_\infty$ may be used as the resulting server imbalance cost at time step t. The server imbalance cost may be based on any number of metrics that relate to load on each server. For instance, the server imbalance may be based on a number of messages for each server (e.g., makespan, the maximal number of messages a server needs to process across all servers), disk space for each server, bandwidth utilization for each server, and CPU usage for each server.

The switching costs represents a cost associated with migrating data streams between servers. The switching cost may be defined by $d(x,y) := 1_k^T |x-y| u$, where $|x-y| \in \mathbb{R}_{\geq 0}^{k \times m}$, represents the number of switches of each data stream and server, and each entry of $u \in \mathbb{R}^m$ denotes the unit switching cost associated to the corresponding server, which may be randomly drawn from a uniform distribution U[0,2].

As noted above, some configurations employ a dynamic planning window. Using the predicted data traffic for the data streams, the planning window module 116 selects a number of future time steps for the planning window. The planning window module 116 may select the planning window based on uncertainty associated with the predicted data traffic. This recognizes that a larger planning window can involve high uncertainty that can result in an inaccurate matching; while a small planning window can result in reallocating data streams to servers too frequently. In accordance with some aspects of the technology described herein, the planning window module 116 selects the planning window such that the total uncertainty of the predicted data traffic in the planning window is less than the maximum switching cost.

The migration module 118 implements the matching determined by the matching module 114. The matching may dictate moving one or more data streams between servers in the server farm 104. The matching may further dictate other management actions for the server farm. For instance, the matching may also dictate adding or removing servers. In some cases, a new server may be added and one or more data streams moved from an existing server to the new server. In other instances, one or more data streams may be moved from a first server to a second server and the first server may be removed from the server farm 104. The matching may further adjust the number of replicas stored by the system for each data stream.

The control system 102 may provide one or more user interfaces to the user device 106 to allow a user to visualize and adjust aspects of the control system 102 and servers in the server farm 104. For instance, the user interfaces may provide reporting on metrics regarding operation of servers in the server farm 104. Additionally, the user interfaces may allow a user to set constraints, such as, for instance, number of replicas for each data stream, number of servers in the server farm 104, maximum disk space for each server, maximum bandwidth utilization for each server, and maximum CPU usage for each server.

The user device 102 can be any type of computing device, such as, for instance, a personal computer (PC), tablet computer, desktop computer, mobile device, or any other suitable device having one or more processors. As shown in FIG. 1, the user device 102 includes an application 120 for interacting with the visual search system 104. The application 108 can be, for instance, a web browser or a dedicated application for interacting with the control system 102 and/or server farm 104, including presenting user interfaces provided by the control system 102.

In some configurations, the control system 102 employs a smoothed online combinatorial optimization approach to select a matching between data streams and servers. An instance of smoothed online combinatorial optimization is composed of a cost function $f: X \times \Theta \to \mathbb{R}_{\geq 0}$ with a decision $x \in X$ and a parameter $\theta \in \Theta$ as inputs, and a switching cost metric $d: X \times X \to \mathbb{R}_{\geq 0}$ to measure the distance of decisions in consecutive time steps. At each time step t, the learner chooses a feasible decision $x_t \in X$ first. After the decision is chosen, a cost function parameterized by $\theta_t$ is revealed. The learner receives a cost $f(x_t, \theta_t)$ and a switching cost $d(x_{t-1}, x_t)$ which measures the movement of the decisions made by time step t and time step t−1. The cumulative cost of an algorithm ALG is defined by:

$$\text{cost}(ALG) = \Sigma_{t=1}^{T} f(x_t, \theta_t) + d(x_t, x_{t-1}).$$

The offline benchmark considered here is the dynamic offline solution that minimizes the total cost:

$$\text{cost}(OPT) = \min_{x_t \in X \forall t} \sum_{t=1}^{T} f(x_t, \theta_t) + d(x_t, x_{t-1})$$

The goal of the learner is to design an algorithm to minimize the cumulative regret with a small dynamic regret bound $\rho(T)$. An online algorithm ALG has a dynamic regret $\rho(T)$ if:

$$\text{Reg}_T := \text{cost}(ALG) - \text{cost}(OPT) \leq \rho(T) \forall T.$$

The following discusses how planning based on predictions works and how to bound the associated dynamic regret using predictive uncertainty. Also discussed are two different sources of regret, predictive uncertainty and the number of planning windows used. A dynamic planning window balances the tradeoff with a regret bound derived. An iterative algorithm solves an offline problem by decoupling the temporal dependency caused by switching cost.

Planning Based On Predictions. This section discusses the connection of predictions and predictive uncertainties to the dynamic regret. To conduct the regret analysis below, the following assumptions are taken:

Assumption 2. The cost function $f(x, \theta)$ is Lipschitz in $\theta \in \Theta$ with Lipschitz constant L, i.e., $$\left\| \frac{\partial f(x, \theta)}{\partial \theta} \right\| \leq L$$

for all $x \in X$ and $\theta \in \Theta$.

Assumption 3. The switching cost is upper bounded in the feasible region X by $B = \sup_{x,y \in X} d(x, y)$.

Assumption 2 is to limit the change of the cost function with respect to the parameter. Assumption 3 limits the amount of switching cost, which can be satisfied when the feasible region is bounded.

Follow The Predictions in Fixed Time Horizon: It is assumed the learner has access to the historical cost parameters and can use a predictive model to predict future predictions with uncertainty. Specifically, at time t, the predictions of the future parameters are denoted by $\{\theta_s^{(t)}\} s \in \mathbb{N}$, $x \geq t$ with uncertainty $\{\epsilon_s^{(t)}\} s \in \mathbb{N}$, $s \geq t$, where the distance between the prediction $\theta_s^{(t)}$ the true parameter $\theta_s$ at time s is bounded by $\|\theta_s - \theta_s^{(t)}\| \leq \epsilon_s^{(t)}$.

At time t, given the previous decision $x_{t-1}$ at time t−1 and the prediction $\{\theta_s^{(t)}\} s \in \mathbb{N}$, $s \geq t$ of the future time steps, the learner selects a planning window $S \in \mathbb{N}$ to plan for the next S time steps using the predictions to solve a minimization problem:

$$\{x_s\}_{s \in \{t, t+1, \ldots, t+S-1\}} = \underset{x_s \in X \forall s}{\arg\min} \sum_{s=t}^{t+S-1} f(x_s, \theta_s^{(t)}) + d(x_s, x_{s-1}).$$

Solving the above finite time horizon optimization problem suggests a solution $\{x_s\}_{s \in \{t, t+1, \ldots, t+S-1\}}$ in the next S time steps to execute starting from time t. However, since the predictions are not perfect, the suggested solution might not be the true optimal solution when the true environment parameters are present. To compare with the optimal offline solution in the next S time steps with the same initial decision $x_{t-1}$, the offline solution is expressed by:

$$\{x'_s\}_{s \in \{t, t+1, \ldots, t+S-1\}} = \underset{x_s \in X_s \forall s}{\arg\min} \sum_{s=t}^{t+S-1} f(x_s, \theta_s) + d(x_s, x_{s-1})$$

The only difference between Eq. (1) and Eq. (2) is that Eq. (2) has full access to the future cost parameters, while Eq. (1) uses the predictions instead. The difference can be defined by:

$$\text{Reg}_t^{t+S-1}(x_{t-1}) = \qquad (3)$$
$$\left( \sum_{s=t}^{t+S-1} f(x_s, \theta_s) + d(x_s, x_{s-1}) \right) - \left( \sum_{s=t}^{t+S-1} f(x'_s, \theta_s) + d(x'_s, x'_{s-1}) \right)$$

Theorem 4. Under Assumption 2, the regret can be upper bounded as follows:

$$\text{Reg}_t^{t+S-1}(x_{t-1}) \leq 2L \Sigma_{s=t}^{t+S-1} \epsilon_s^{(t)}.$$

Theorem 4 suggests that the cumulative regret is upper bounded by the total predictive uncertainty within the planning window.

Dynamic Planning Window and Regret Bound: Theorem 4 links the dynamic regret with the total predictive uncertainty. However, it is assumed that the predictive uncertainty can grow when trying to predict the parameters in the far future, $\epsilon_s^{(t)}$ is increasing in s, while the predictive uncertainty can shrink when collecting more data, i.e., $\epsilon_s^{(t)}$ is decreasing in t.

The result in Theorem 4 suggests to use smaller planning windows to keep the total uncertainty low. On the other hand, the initial decision $x_{t-1}$ needs not be identical to the one in the offline optimal $x^*_{t-1}$. To compare the performance, the initial decisions are aligned. Such discrepancy produces at most B regret for every planning window, which suggests to use larger planning windows to reduce the number of planning windows used.

The two sources of regret may be balanced by choosing the largest planning window S such that:

$$2L \Sigma_{s=t}^{t+S-1} (\epsilon_s^{(t)} - C) \leq B \qquad (4)$$

where $\epsilon_s^{(t)}$ is assumed to be lower bounded by $C \geq 0$, e.g., an irreducible noise with magnitude C is present in the cost function parameters that the predictive model cannot predict. The choice of the dynamic planning window can ensure that the total excessive predictive uncertainty is upper bounded by cost B, while also planning as far as possible to reduce the number of planning windows. The algorithm is described in Algorithm 1.

| Algorithm 1: Dynamic Future Planning |
|---|

Input: Total time steps T. Maximal switching cost B. Lower bound of uncertainty $C \geq 0$. A predictive model that can provide predictions $\{\theta_{t+s}^{(t)}\}s \in \mathbb{N}$ at time t.
Initialization: $t = 1, 1 = 0$.
1:    while $t \leq T$ do
2:       Get predictions $\{\theta_s^t\}s \in \mathbb{N}, s \geq t$ and predictive uncertainty $\{\epsilon_s^{(t)}\}s \in \mathbb{N}, s \geq t$ from the model.
3:       Find the largest S s.t. $2L \Sigma_{s=t}^{t+s-1}(\epsilon_s^{(t)} - C) \leq B$.
4:       Solve the optimization problem in Eq. (1) with starting time t and planning window S to get $\{x_s\}_{s \in \{t,t+1,\ldots,t+S-1\}}$.
5:       Execute $x_s$, and receive $\theta_s$ with cost $f(x_s, \theta_s) + d(x_s, x_{s-1})$ at time $s \in \{t, \cdots, t + S - 1\}$
6:       Set $t = t + S, l = l + 1$
7:    end while Theorem 5. Given Lipschitzness L in Assumption 2 and the maximal switching cost B in Assumption 3, in T time steps, Algorithm 1 achieves cumulative regret upper bounded by $2LCT+2BI$, where I is the total number of planning windows used in Algorithm 1.

Proof sketch. The regret of the algorithm comes from two parts: (i) regret from the discrepancy of the initial decision $x_{t-1}$ and the initial decision of the offline optimal $x^*_{t-1}$ at time t, the start of every planning window, and (ii) the incorrect predictions used in the optimization, which is bounded by Theorem 4.

The regret in part (i) is bounded by $d(x_{t-1}, x^*_{t-1}) \leq B$ for every planning window because it would take at most the maximal switching cost B to align different initial decisions before comparison. Thus, the total regret in part (i) is bounded by BI.

The regret in part (ii) is bounded by Theorem 4 and the choice of the dynamic planning window in Eq. (4). This provides $\text{Reg}_t^{t+S-1}(x^*_{t-1}) \leq 2L\Sigma_{s=t}^{t+S_t-1}\epsilon_s^{(t)} \leq 2LCS_i+B$ for the i-th window. Summation is taken over all planning windows to bound the total regret in part (ii) by:

$$\Sigma_{i=1}^I 2LCS_i + B = 2LCT + BI$$

where combining two bounds concludes the proof.

Theorem 5 links the excessive dynamic regret to I, the number of planning windows that Algorithm 1 uses. The next step is to bound I using total time steps T. Theorem 6 below shows that when the uncertainties $\epsilon_s^{(t)}$ asymptotically converge to C with a polynomial rate when t goes to infinity, the total number of planning windows can be bounded by a function of T, which provides a regret bound purely as a function of T.

Theorem 6. Under Assumption 2 and 3, let B denote the maximal switching cost, and let L denote the Lipschitzness. Given two non-negative real values a, $b \in \mathbb{R}_{\geq 0}$, uncertainty provided by the predictive model satisfies $$\epsilon_{t+S-1}^t \leq C + O\left(\frac{s^a}{t^b}\right), \forall s, t \in \mathbb{N}:$$

$$\text{Reg}_T = \begin{cases} 2LCT + O(T^{1-\frac{b}{a+1}}) & \text{if } b < a+1 \\ 2LCT + O(\log T) & \text{if } b = a+1 \\ 2LCT + O(\log\log T) & \text{if } b > a+1 \end{cases}$$

Theorem 6 simplifies the regret bound in Theorem 5 by bounding I, the total number of planning windows, by a function of T. Theorem 6 also summarizes the effect of the convergence of predictive uncertainty on the cumulative regret. Specifically, when the predictive uncertainty asymptotically and polynomially converges to C=0 when more training data is collected, the regret bound suggests by Theorem 6 is sublinear when b>0.

Lower Bound on the Cumulative Regret. The previous section shows an upper bound on the cumulative regret achieved by Algorithm 1 when the predictive uncertainty satisfies certain convergence rate. This section provides a lower bound on the expected cumulative regret, showing that no randomized algorithm can achieve an expected cumulative regret lower than a term similar to the upper bound.

Theorem 7. Given $$\epsilon_{t+s-1}^{(t)} = C + \Theta\left(\frac{1}{t^b}\right)$$

for all $t, s \in \mathbb{N}$ with $0 \leq b$, there exist instances such that for any randomized algorithm, the expected regret is at least:

$$\mathbb{E}[\text{Reg}_T] \geq \begin{cases} LCT + \Theta(T^{1-b}) & \text{if } b < 1 \\ LCT + \Theta(\log T) & \text{if } b = 1 \\ LCT + \Theta(1) & \text{if } b > 1 \end{cases} \quad (1)$$

The first implication of Theorem 7 is that the dependency on the lower bound C is inevitable. This suggests that the linear term LCT cannot be removed if the predictive uncertainty is lower bounded by C. Independently, one can find that the term LCT in the lower bound is strictly smaller than the term 2LCT in the upper bound. This is because the bound in Theorem 7 is a lower bound on the expected cumulative regret, while the bound in Theorem 6 is an upper bound on the worst cumulative regret.

On the other hand, Theorem 7 only considers the case where $$\epsilon_{c+S-1}^t = C + \Theta\left(\frac{1}{t^b}\right),$$

which corresponds to the case a=0 in Theorem 6. The lower bound matches to the upper bound when $b \leq 1$ and a=0, where the algorithm is tight up to a constant.

Offline Problem with Switching Cost. Given predictions, the online problem can be reduced to an offline problem. This section focuses on solving the following offline combinatorial optimization problem with switching cost.

$$\min_{x_t \in X} \sum_{t=1}^{S} f(x_t, \theta_t) + d(x_t, x_{t-1}) \quad (5)$$

Solving Eq. (5) is challenging because the combinatorial structure of the decision $x_t \in x_t$ and the additional temporal dependency caused by the switching cost $d(x_t, x_{t-1})$.

Decomposition and Iterative Algorithm: If the assignments $x_{t-1}$, $x_{t+1}$ are fixed, finding the optimal solution at time step t reduces to the following problem with c=1:

$$x_t = \arg\min_{x \in X_t} f(x, \theta_t) + c(d(x, x_{t-1}) + d(x, x_{t+1})) \quad (6)$$

Compared to Eq. (5), Eq. (6) avoids the temporal dependency across multiple time steps and largely reduces the number of binary variables. In practice, solving Eq. (6) is more tractable than solving Eq. (5).

This observation motivates iteratively fixing the neighbor decisions $x_{t-1}$, $x_{t+1}$ and updating the decision at time step t for all $t \in [S]$. The process uses $x_t = x_0$ to initialize all decisions. Then Eq. (6) can be iteratively solved with different t to update the decision $x_t$. This method decouples the temporal dependency and reduces the problem to a standard combinatorial optimization of function $f$ with additional regularization terms. Mixed integer linear program or any other approximation algorithms can be used to solve Eq. (6).

Moreover, any improvement made by solving Eq. (6) with c=1 provides the same improvement to Eq. (5). This suggests that the optimal decision of Eq. (5) is a fixed point of Eq. (6) when c=1.

Theorem 8. The optimal sequence $\{x^*_t\}_{t \in [S]}$ of Eq. (5) is a fixed point of Eq. (6) with c=1.

However, in practice, there could be multiple fixed points and suboptimal points due to the combinatorial structure. To avoid getting stuck by suboptimal solutions, a smaller scaling constant c=0.5 can be used to relax the iterative update, and c=1 can be used in the final step to strengthen the solution. The iterative algorithm is described in Algorithm 2, which can be used to replace Line 4 in Algorithm 1.

| Algorithm 2: Iterative algorithm for offline problems |
| --- |
| 1:       Let J = 10 and $x_t = x_0$ for all $t \in [S]$ |
| 2:       for $j \in [j]$ do |
| 3:          for $t \in [S]$ do |
| 4:             Let c = 0.5 if j < J otherwise c = 1. |
| 5:             Solve Eq. (6) with $x_{t-1}$, $x_{t+1}$, c to update $x_t$. |
| 6:          end for |
| 7:       end for |

Example Methods for Controlling Data Stream Matching to Servers

Figure 4:
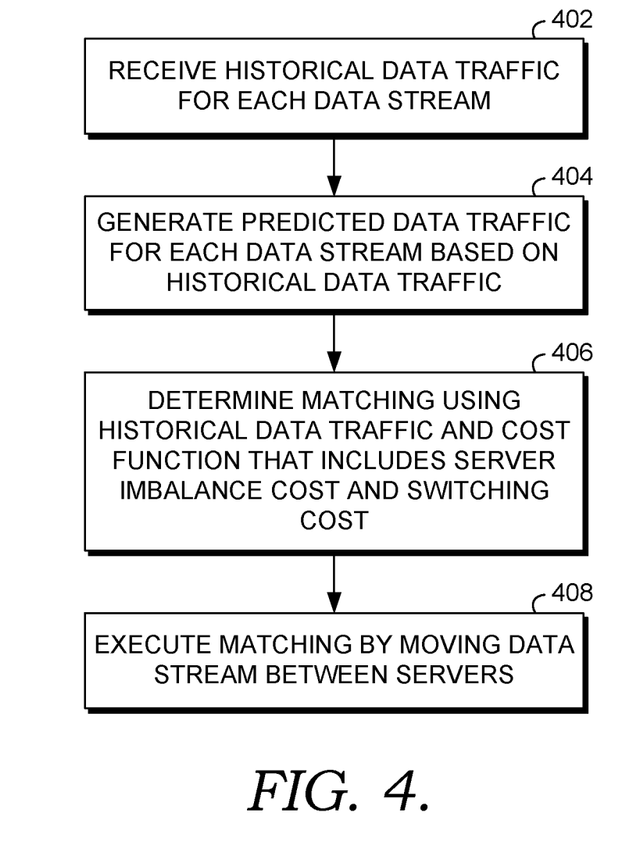
FIG. 4 is a flow diagram showing a method for using predicted data traffic for data streams to determine a matching between data streams and servers in a streaming data system in accordance with some implementations of the present disclosure.

With reference now to FIG. 4, a flow diagram is provided that illustrates a method 400 for using predicted data traffic for data streams to determine a matching between data streams and servers. The method 400 may be performed, for instance, by the control system 102 of FIG. 1. Each block of the method 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 402, historical data traffic is received for each data stream for a streaming data system. The historical data traffic may comprise a data rate value for each data stream at each of a number of past time steps. Given the historical data traffic, predicted data traffic is generated for each data stream for each of a number of future time steps, as shown at block 404. The predicted data traffic may be generated using a machine learning model, such as a Gaussian regression model.

Using the predicted data traffic, an optimal matching between the data streams being processed by the streaming data system and servers in the streaming data system is determined, as shown at block 406. In accordance with some aspects of the technology described herein, the matching is determined using a cost function that determines a server imbalance cost and switching cost at future time steps given the predicted data traffic at the future time steps. In particular, an optimization problem is solved to select a matching between data streams and servers that minimizes the total cost of the server imbalance cost and switching cost. The matching may be selected for a planning window that comprises a certain number of future time steps. In some instances, the planning window may be fixed, while in other instances, the planning window may be dynamically determined, for instance, using the method 500 of FIG. 5 described below.

The control system executes the matching at a future time step, as shown at block 408. This may include moving one or more data streams between servers. The matching may also dictate other management actions, such as adding or removing one or more servers, or adjusting the number of replicas processed by the system for each data stream.

Figure 5:
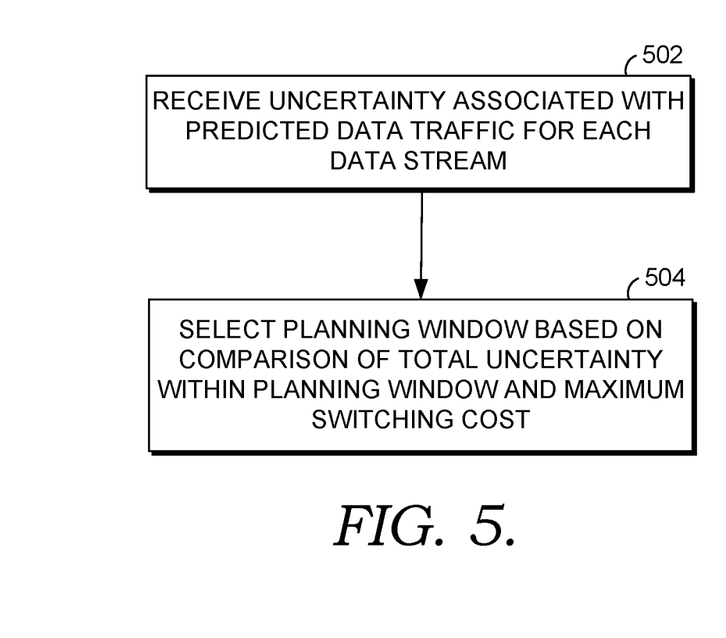
FIG. 5 is a flow diagram showing a method for determining a dynamic planning window in accordance with some implementations of the present disclosure.

Turning next to FIG. 5, a flow diagram is provided that illustrates a method for determining a dynamic planning window. As shown at block 502, an uncertainty associated with predicted data traffic is received for each data stream being processed by the streaming data system. The uncertainty is a measure of the reliability of the predictions used to generate the predicated data traffic from historical data traffic for each data stream (e.g., at block 404 of FIG. 4). For instance, the predicted data traffic may be generated using a Gaussian regression model, and the standard deviation learned from the Gaussian process regression may be used as the uncertainty.

As shown at block 504, a planning window is dynamically determined using the uncertainty associated with the predicted data traffic. In particular, the planning window may be selected based on a comparison of total uncertainty within a planning window and maximum switching cost. For instance, the planning window may be selected such that the total uncertainty associated with predicated data traffic for all data streams in the planning window is less than a maximum switching cost.

Exemplary Operating Environment

Figure 6:
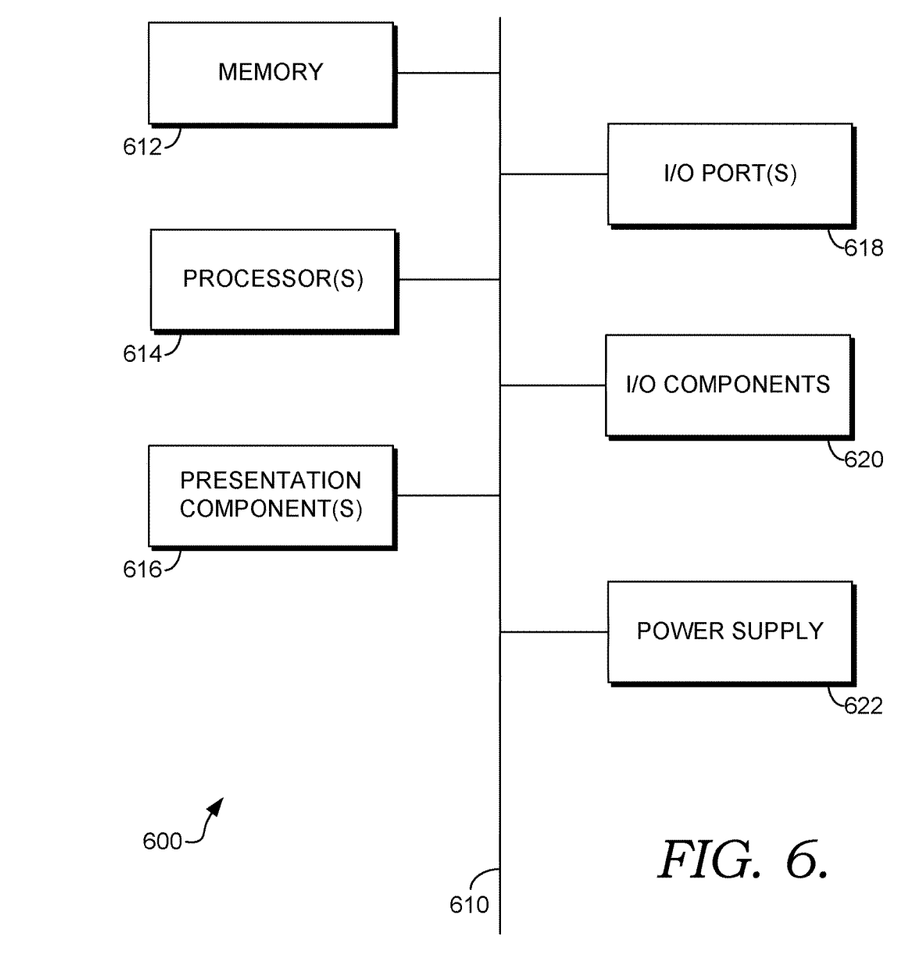
FIG. 6 is a block diagram of an exemplary computing environment suitable for use in implementations of the present disclosure.

Having described implementations of the present disclosure, an exemplary operating environment in which embodiments of the present technology may be implemented is described below in order to provide a general context for various aspects of the present disclosure. Referring initially to FIG. 6 in particular, an exemplary operating environment for implementing embodiments of the present technology is shown and designated generally as computing device 600. Computing device 600 is but one example of a suitable computing environment and is not intended to suggest any limitation as to the scope of use or functionality of the technology described herein. Neither should the computing device 600 be interpreted as having any dependency or requirement relating to any one or combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology described herein may be practiced in a variety of system configurations, including hand-held devices, consumer electronics, general-purpose computers, more specialty computing devices, etc. The technology described herein may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion.

Aspects of the present technology have been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however, the distributed computing environment depicted herein is merely exemplary. Components can be configured for performing certain embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method comprising:
generating, using a machine learning model, predicted data traffic for each data stream of a plurality of data streams based on historical data traffic for each data stream;
determining a matching plan based on the predicted data traffic, the matching plan defining a matching between the plurality of data streams and a plurality of servers that minimizes an overall cost, the overall cost comprising a switching cost for moving stored data associated with one or more of the data streams between servers and a server imbalance cost; and
executing, using a processing device, the matching plan by causing a first data stream of the plurality of data streams to be moved from a first server to a second server.

2. The method of claim 1, wherein the matching plan is determined by solving an optimization problem that minimizes the overall cost comprising the switching cost and the server imbalance cost.

3. The method of claim 1, wherein the method further comprises:
determining uncertainty values indicative of uncertainty associated with predictions used to generate the predicted data traffic for each data stream; and
selecting a planning window based on the uncertainty values, wherein the matching plan is determined based on the selected planning window.

4. The method of claim 3, wherein the planning window is selected such that a total uncertainty associated with the predicted data traffic within the planning window is less than a maximum switching cost.

5. The method of claim 4, wherein the predicted data traffic for each data stream comprises a predicted data traffic value for each future time step from a plurality of future time steps, and wherein the uncertainty values associated with the predicted data traffic for each data stream comprises an uncertainty value for each future time step from the plurality of future time steps, and wherein the planning window is selected by determining a subset of future time steps from the plurality of future time steps based on the uncertainty values associated with the subset of future time steps.

6. The method of claim 1, wherein the first data stream comprises a replica of another data stream.

7. The method of claim 1, wherein the matching plan includes adding the second server as a new server prior to moving the first data stream.

8. The method of claim 1, wherein the matching plan includes removing the first server after moving the first data stream.

9. One or more non-transitory computer storage media storing instructions that, when executed by one or more processors, cause the one or more processors to perform operations, the operations comprising:
receiving, from a machine learning model, predicted data traffic for each data stream from a plurality of data streams for a planning window comprising one or more future time steps;
selecting, for a future time step in the planning window, a matching plan based on the predicted data traffic, the matching plan defining a matching between the plurality of data streams and a plurality of servers that minimizes an overall cost, the overall cost comprising a switching cost for moving stored data associated with one or more of the data streams between servers and a server imbalance cost; and
allocating the plurality of data streams to the plurality of servers based on the selected matching plan.

10. The computer storage media of claim 9, wherein the operations further comprise:
selecting the planning window based on uncertainty values indicative of uncertainty associated with predictions used to generate the predicted data traffic for each data stream.

11. The computer storage media of claim 10, wherein the planning window is selected such that a total uncertainty associated with the predicted data traffic within the planning window is less than a maximum switching cost.

12. The computer storage media of claim 11, wherein the predicted data traffic for each data stream comprises a predicted data traffic value for each future time step from a plurality of future time steps, and wherein the uncertainty values associated with the predicted data traffic for each data stream comprises an uncertainty value for each future time step from the plurality of future time steps, and wherein the planning window is selected by determining a subset of future time steps from the plurality of future time steps based on the uncertainty values associated with the subset of future time steps.

13. The computer storage media of claim 9, wherein the server imbalance cost is a function of one or more selected from the following: a number of messages for each server, disk space for each server, bandwidth utilization for each server, and CPU usage for each server.

14. The computer storage media of claim 9, wherein allocating the plurality of data streams to the plurality of servers comprises moving a first data stream of the plurality of data streams, along with a first stored data associated the first data stream, from a first server to a second server.

15. The computer storage media of claim 14, wherein allocating the plurality of data streams to the plurality of servers further comprises: adding the second server as a new server prior to moving the first data stream, or removing the first server after moving the first data stream.

16. A system comprising:
a memory device; and
a processing device, operatively coupled to the memory device, to perform operations comprising:
generating, using a machine learning model and historical data traffic for each data stream from a plurality of data streams, predicted data traffic for each data stream;
determining a matching plan based on the predicted data traffic at a first future time step during a planning window comprising one or more future time steps, the matching plan defining a matching between the plurality of data streams and a plurality of servers that minimizes an overall cost, the overall cost comprising a switching cost for moving stored data associated with one or more of the data streams between servers and a server imbalance cost; and
causing, based on the matching plan, a first data stream of the plurality of data streams to be moved from a first server to a second server at the first future time step.

17. The system of claim 16, wherein the operations further comprise:
selecting the planning window based on uncertainty values indicative of uncertainty associated with predictions used to generate the predicted data traffic for each data stream.

18. The system of claim 17, wherein the planning window is selected such that a total uncertainty associated with the predicted data traffic within the planning window is less than a maximum switching cost.

19. The system of claim 18, wherein the predicted data traffic for each data stream comprises a predicted data traffic value for each future time step from a plurality of future time steps, and wherein the uncertainty values associated with the predicted data traffic for each data stream comprises an uncertainty value for each future time step from the plurality of future time steps, and wherein the planning window is selected by determining a subset of future time steps from the plurality of future time steps based on the uncertainty values associated with the subset of future time steps.

20. The system of claim 16, wherein the server imbalance cost is a function of one or more selected from the following: a number of messages for each server, disk space for each server, bandwidth utilization for each server, and CPU usage for each server.

* * * * *